(12) United States Patent
Wang

(10) Patent No.: US 7,931,801 B2
(45) Date of Patent: Apr. 26, 2011

(54) AQUARIUM FILTER SYSTEM

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 82 days.

(21) Appl. No.: 12/566,099

(22) Filed: Sep. 24, 2009

(65) Prior Publication Data

US 2011/0068055 A1   Mar. 24, 2011

(51) Int. Cl.
*A01K 63/04* (2006.01)

(52) U.S. Cl. .............. 210/167.23; 210/167.26; 210/905; 119/259; 119/261

(58) Field of Classification Search .............. 210/167.21, 210/167.22, 167.23, 167.24, 167.26, 905; 119/259, 260, 261

See application file for complete search history.

(56) References Cited

U.S. PATENT DOCUMENTS

| | | | | |
|---|---|---|---|---|
| 2,715,609 A | * | 8/1955 | Hansen | 210/167.23 |
| 2,782,161 A | * | 2/1957 | Willinger et al. | 210/167.24 |
| 3,006,476 A | * | 10/1961 | Halpert | 210/167.24 |
| 3,864,261 A | * | 2/1975 | Masterjoseph | 210/163 |
| 4,035,298 A | * | 7/1977 | Cloke et al. | 210/167.24 |
| 4,186,093 A | * | 1/1980 | Willinger | 210/167.24 |
| 4,481,905 A | * | 11/1984 | Fonseca | 119/261 |
| 4,957,623 A | * | 9/1990 | Henzlik | 210/167.23 |
| 5,062,951 A | * | 11/1991 | Tominaga | 210/167.23 |
| 5,451,443 A | * | 9/1995 | Wechsler | 428/99 |
| 5,582,719 A | * | 12/1996 | Nagano | 210/139 |
| 7,785,476 B2 | * | 8/2010 | Newman | 210/703 |

FOREIGN PATENT DOCUMENTS

JP   58-166911 A   * 10/1983
JP   7-50953 A   * 2/1995

* cited by examiner

*Primary Examiner* — Fred Prince

(74) *Attorney, Agent, or Firm* — Guice Patents PLLC

(57) ABSTRACT

An aquarium filter system mainly has a base and an uprightly mounted filtering cylinder; the filtering cylinder is provided therein with a pump unit, it can be optionally used to spray forceful water jet on the surface board of the base or to pump air into the filtering cylinder to form air bubbles in water in the filtering cylinder; after filtering, seawater in an aquarium can be kept clean.

9 Claims, 6 Drawing Sheets

AQUARIUM FILTER SYSTEM

BACKGROUND OF THE INVENTION

1. Field of the Invention

The present invention relates to an aquarium filter system, and especially to a seawater filter system.

2. Description of the Prior Art

In a seawater aquarium, normally a skimmer is provided to collect and remove the garbage on the water surface. A conventional skimmer is provided therein with an extraction pump to suck water in, while the garbage is filtered out through an inner filter.

Such a conventional skimmer has limitation in designing; thereby the effect of removing garbage is not good. Particularly, water suction has only a single passage through the pump which is subjected to blocking, not only the convenience of use is affected, but also the life of use of the pump is short, and improvement is wanted.

SUMMARY OF THE INVENTION

The present invention thereby provides an aquarium filter system that has a base and an uprightly mounted filtering cylinder; the filtering cylinder is provided therein with a pump unit, it can be optionally used to spray forceful water jet on the surface board of the base or to pump air into the filtering cylinder to form air bubbles in water in the filtering cylinder; after filtering, seawater in the aquarium can be kept clean.

And more, the aquarium filter system of the present invention is provided in the aquarium, and comprises:

the base, laid flat on the bottom surface of the aquarium, the base is a hollow board of which the upper surface plate has a lot of holes, its hollow interior is filled with filtering cotton;

the filtering cylinder is mounted to be perpendicular to the base, and has an outer housing unit, and is provided on its inner bottom layer with a pump unit, further is provided at an outlet on one side of it in opposition to the pump unit with a water discharging hole which is operated with a pushing plate provided on an outer wall of the filtering cylinder to optionally open or close; an inner middle layer of the outer housing unit is provided sequentially upwards from below with a filtering box for flowing of water and is provided with a garbage collecting board, the garbage collecting board is provided with a lot of through holes for flowing therethrough of water, and the filtering cylinder is provided on its front and back sides above the garbage collecting board with a plurality of grid holes for flowing in of water, an interior upper layer of the outer housing unit has a closed cover; and more, the filtering cylinder is provided on an inner side in opposition to the outlet of the pump unit with a upright chimney unit which extends to the uppermost layer of the filtering cylinder;

an electric power line extending to the filtering cylinder to provide electric power; and, an air pipe extending from outside of the aquarium to have its end connected to an air inlet of the pump unit, and to have its other end provided with an air conditioning valve.

When the pushing plate closes the water discharging hole, the air conditioning valve opens, then the pump unit pumps the air into the water to form air bubbles in the chimney unit of the filtering cylinder to be led up into the uppermost layer to bring garbage to the garbage collecting board for collecting and filtering, and then water after filtering passes the base and flows into the aquarium;

When the pushing plate opens the water discharging hole, the air conditioning valve closes; then the pump unit generates forceful water jet spraying from the water discharging hole to the upper surface plate to create vortex, and to change the toxic material in the water into bubbles which are floated upwards to flow into the grid holes of the filtering cylinder to be filtered.

The primary object of the present invention is to provide an aquarium filter system which is provided in an aquarium, a forceful water jet can be sprayed on a base of the aquarium to generate a phenomenon of vortex to change toxic material into bubbles which are floated upwards into the aquarium and flow into the filtering cylinder to be filtered, then air bubbles are pumped into the filtering cylinder to make garbage (such as bubbled protein etc.) be collected onto a garbage collecting board for being removed easily and for maintaining cleanness of water in the aquarium; this system particularly is appropriated for using in a seawater water aquarium.

Another object of the present invention is to provide an aquarium filter system in which the filtering cylinder can be adjusted in its vertical length in pursuance of requirement.

The present invention will be apparent in its feature of structure and effect of use after reading the detailed description of the preferred embodiments thereof in reference to the accompanying drawings.

DETAILED DESCRIPTION OF THE PREFERRED EMBODIMENT

Figure 1:
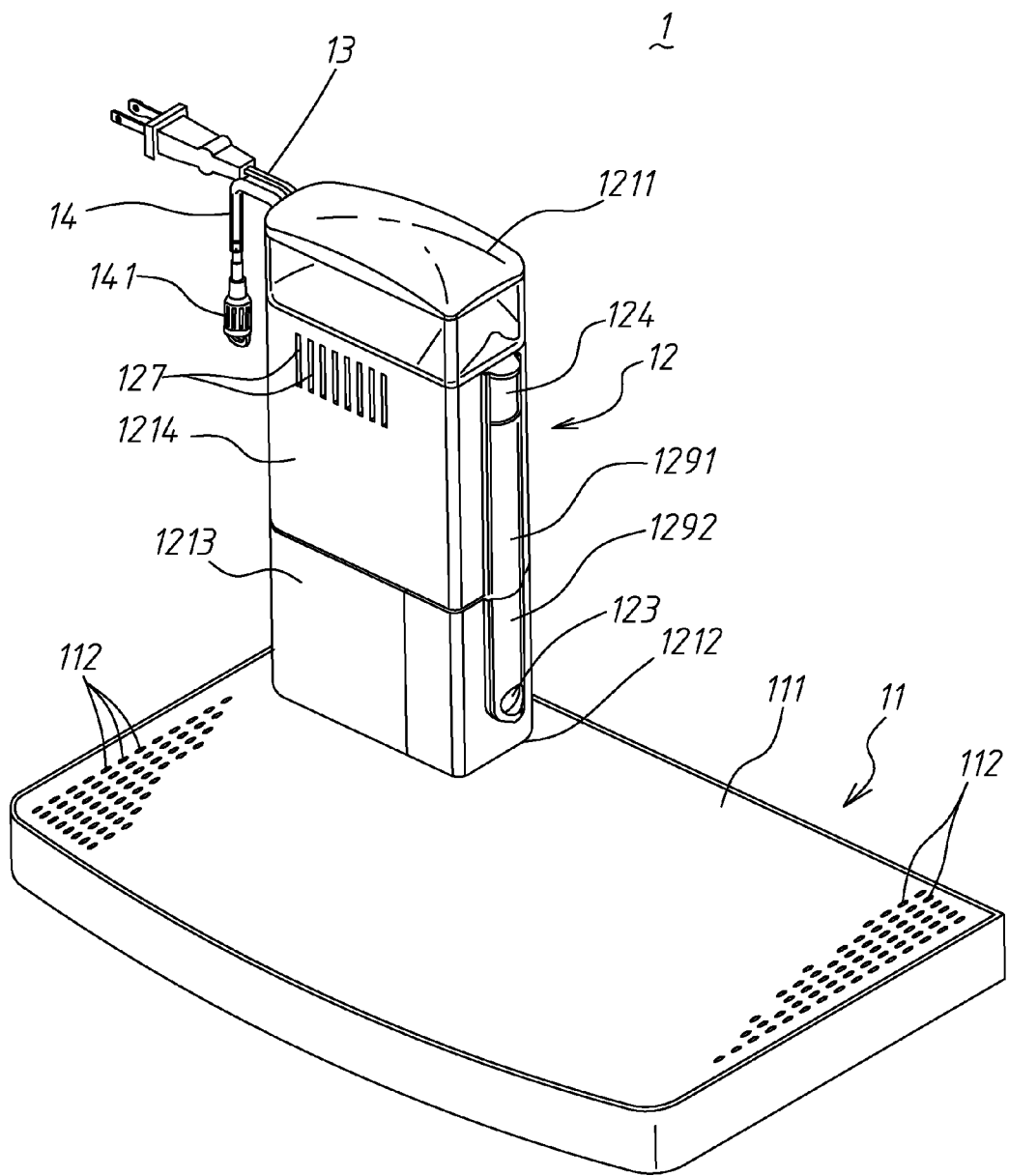
FIG. 1 is a perspective view showing the appearance of the present invention.
Figure 2:
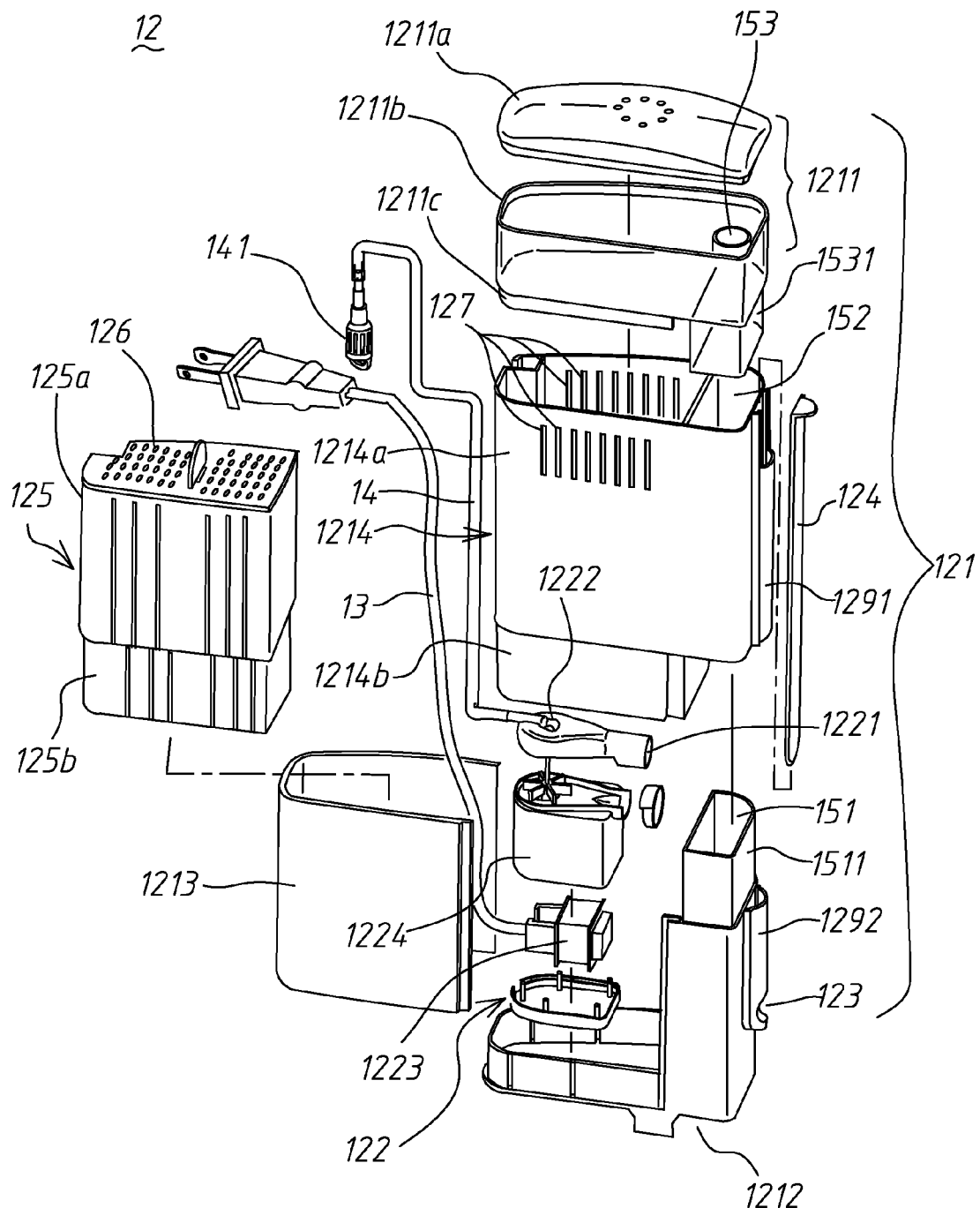
FIG. 2 is an anatomic perspective view of a filtering cylinder of the present invention.
Figure 3:
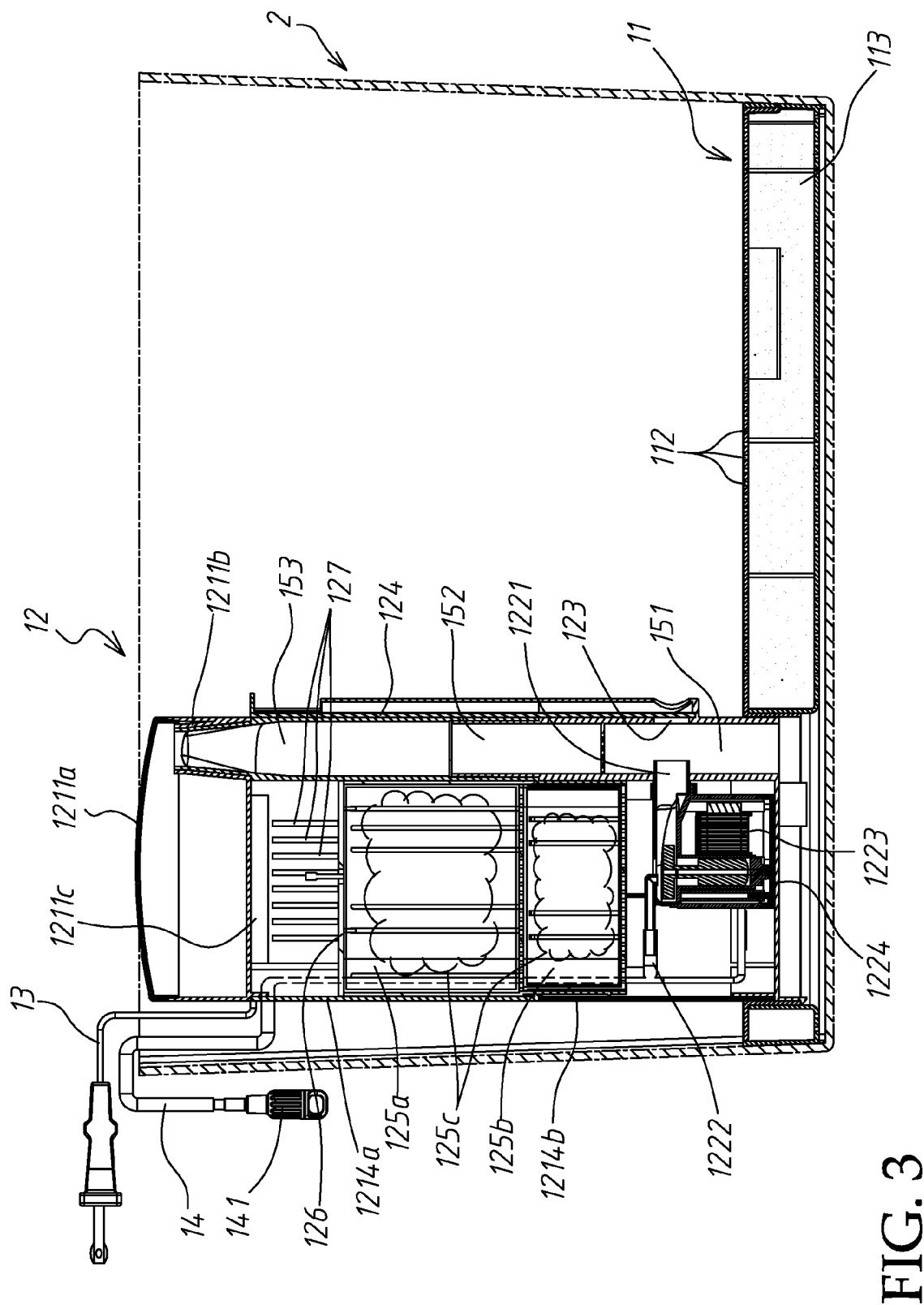
FIG. 3 is a sectional view of the present invention.

Referring to FIGS. 1-3, an aquarium filter system of the present invention is provided in an aquarium 2 (please refer to FIG. 3), the filter system comprises a base 11, a filtering cylinder 12, an electric power line 13 and an air pipe 14.

The base 11 is laid flat on the bottom surface of the aquarium 2, the base 11 is a hollow board of which an upper surface plate 111 of it has a lot of holes 112, the hollow interior is filled with filtering cotton 113 (please refer to FIG. 3).

The filtering cylinder 12 is mounted to be perpendicular to the base 11. As shown in FIG. 2, the filtering cylinder 12 has an outer housing unit 121, and is provided on its inner bottom layer with a pump unit 122, further is provided at an outlet 1221 on one side of it in opposition to the pump unit 122 with a water discharging hole 123 which is operated with a pushing plate 124 provided on an outer wall of the filtering cylinder 12 to optionally open or close. An inner middle layer of the outer housing unit 121 is provided sequentially upwards from below with a filtering box 125 for flowing of water and is provided with a garbage collecting board 126, the garbage collecting board 126 is provided with a lot of through holes for flowing therethrough of water, and the filtering cylinder 12 is provided on its front and back sides above the garbage collecting board 126 with a plurality of grid holes 127 for flowing in of water. An upper layer of the outer housing unit 121 has a closed cover 1211. And more, the filtering cylinder 12 is provided on an inner side in opposition to the outlet 1221 of the pump unit 122 with an upright chimney unit which extends to the uppermost layer of the filtering cylinder 12.

An electric power line 13 extends to the pump unit 122 to provide electric power. And an air pipe 14 extends from outside of the aquarium 2 to have its end connected to an air inlet 1222 of the pump unit 122, and to have its other end provided with an air conditioning valve 141.

The filtering box 125 has a first filtering box 125a and a second filtering box 125b stacking one over the other, the interiors of the first filtering box 125a and the second filtering box 125b are filled with filtering cotton 125c.

A lower layer of the outer housing unit 121 is formed to have an L shaped seat 1212 and a U shaped frame 1213 enveloping the L shaped seat 1212, the pump unit 122 is mounted between the L shaped seat 1212 and the U shaped frame 1213, and the water discharging hole 123 is provided on the vertical surface of the L shaped seat 1212.

Figure 6:
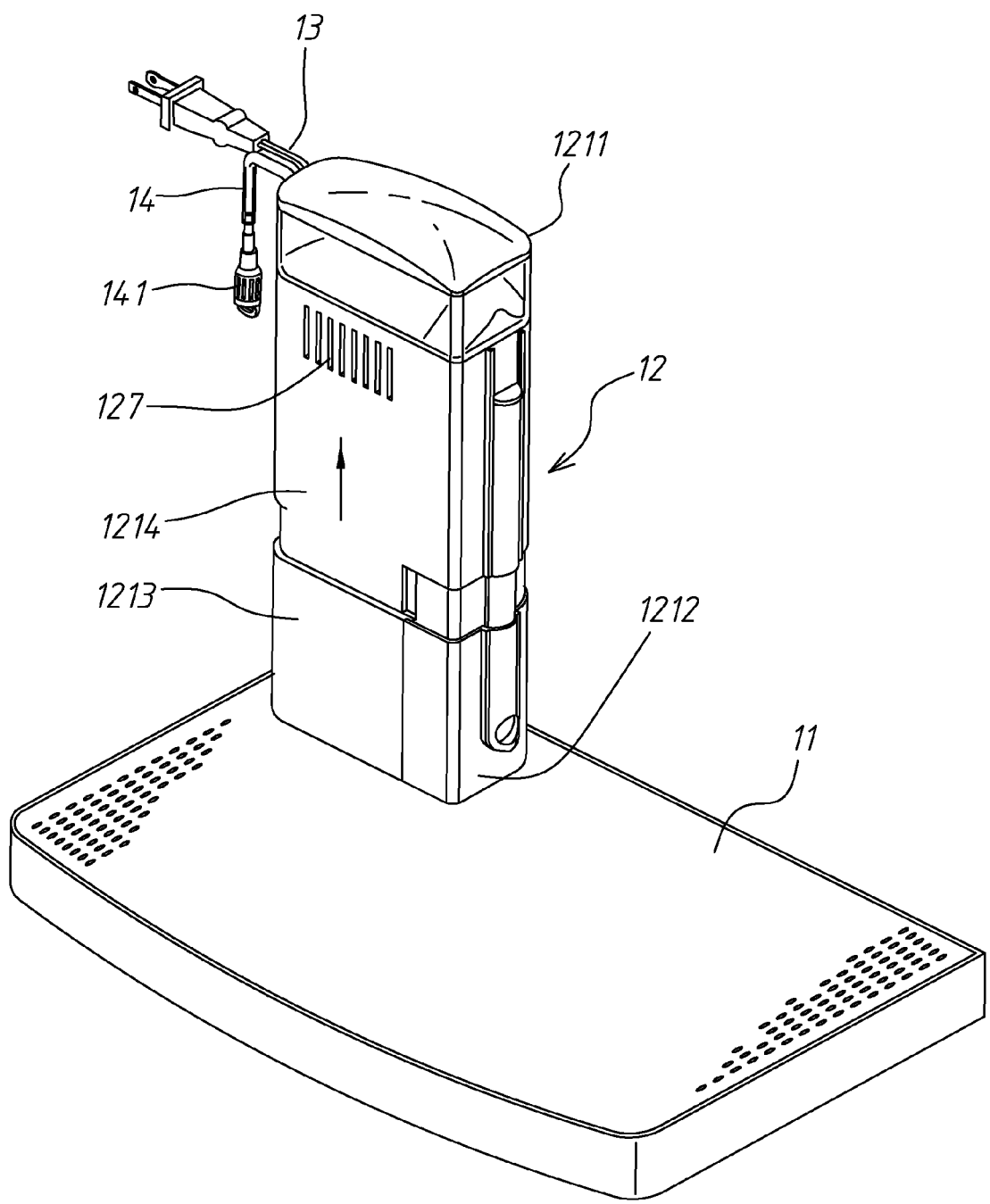
FIG. 6 is a view similar to FIG. 1, wherein the vertical length of the filtering cylinder has been adjusted.

The middle layer of the outer housing unit 121 is formed a middle layer part 1214 composed of an upper section 1214a and a lower section 1214b integrally connected with each other, the sectional area of the upper section 1214a is larger than that of the lower section 1214b; the lower section 1214b can be slipped downwards in the U shaped frame 1213, and the two can be extended/contracted relatively to each other in order to adjust the length of the whole filtering cylinder 12, such as is shown in FIGS. 1 and 6, wherein FIG. 6 shows the state of extending to increase vertical length.

A cover 1211 at an upper layer of the outer housing unit 121 is made of transparent material, in favor of examining whether the collected garbage on the garbage collecting board 126 shall be removed. The cover 1211 is composed of a lid 1211a and a square frame 1211b; the square frame 1211b has on its bottom edge a flange 1211c for slipping over the middle layer part 1214.

Figure 4:
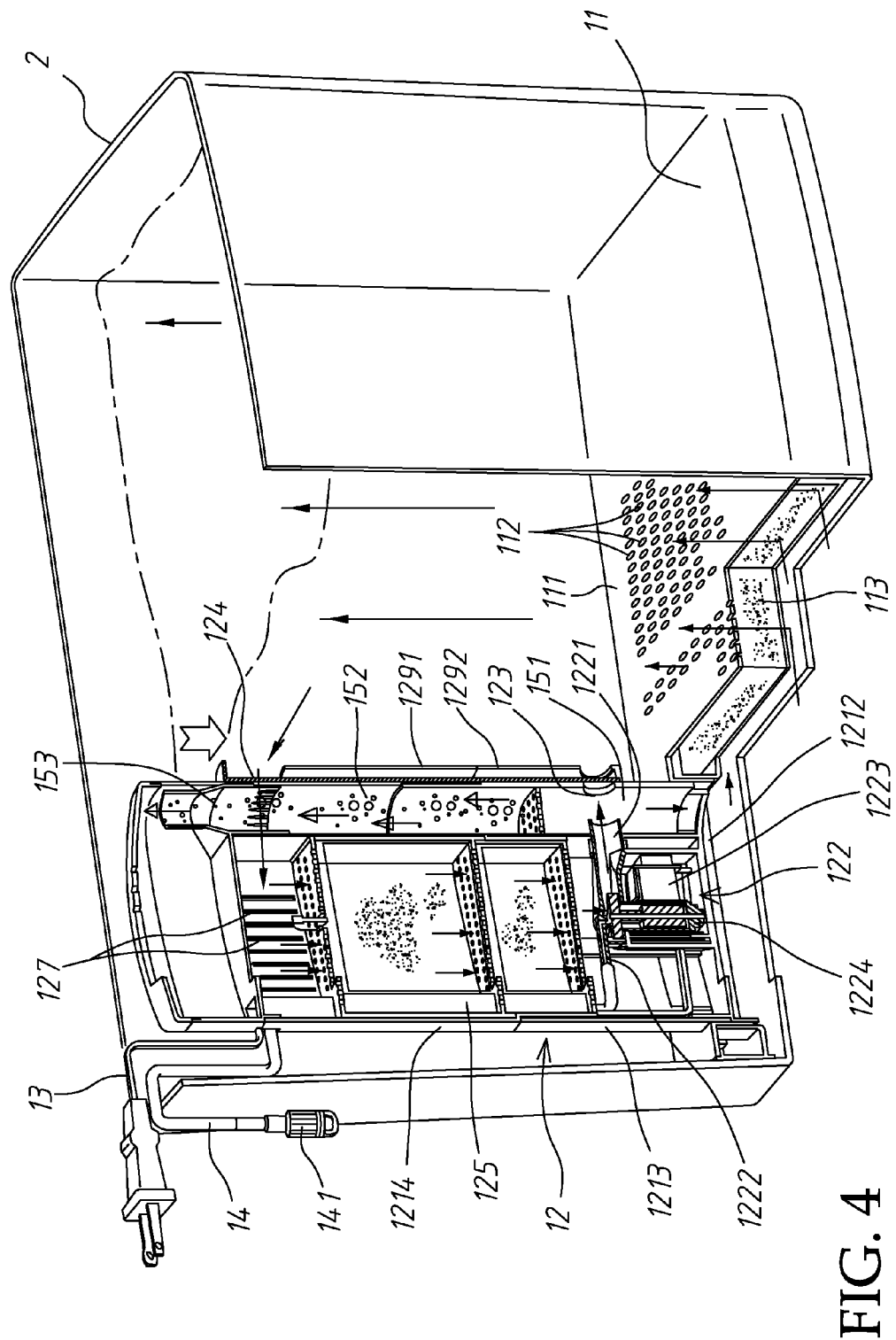
FIG. 4 is a schematic perspective view of the present invention showing the action of water flow, wherein air is pumped into the filtering cylinder to form bubbles.
Figure 5:
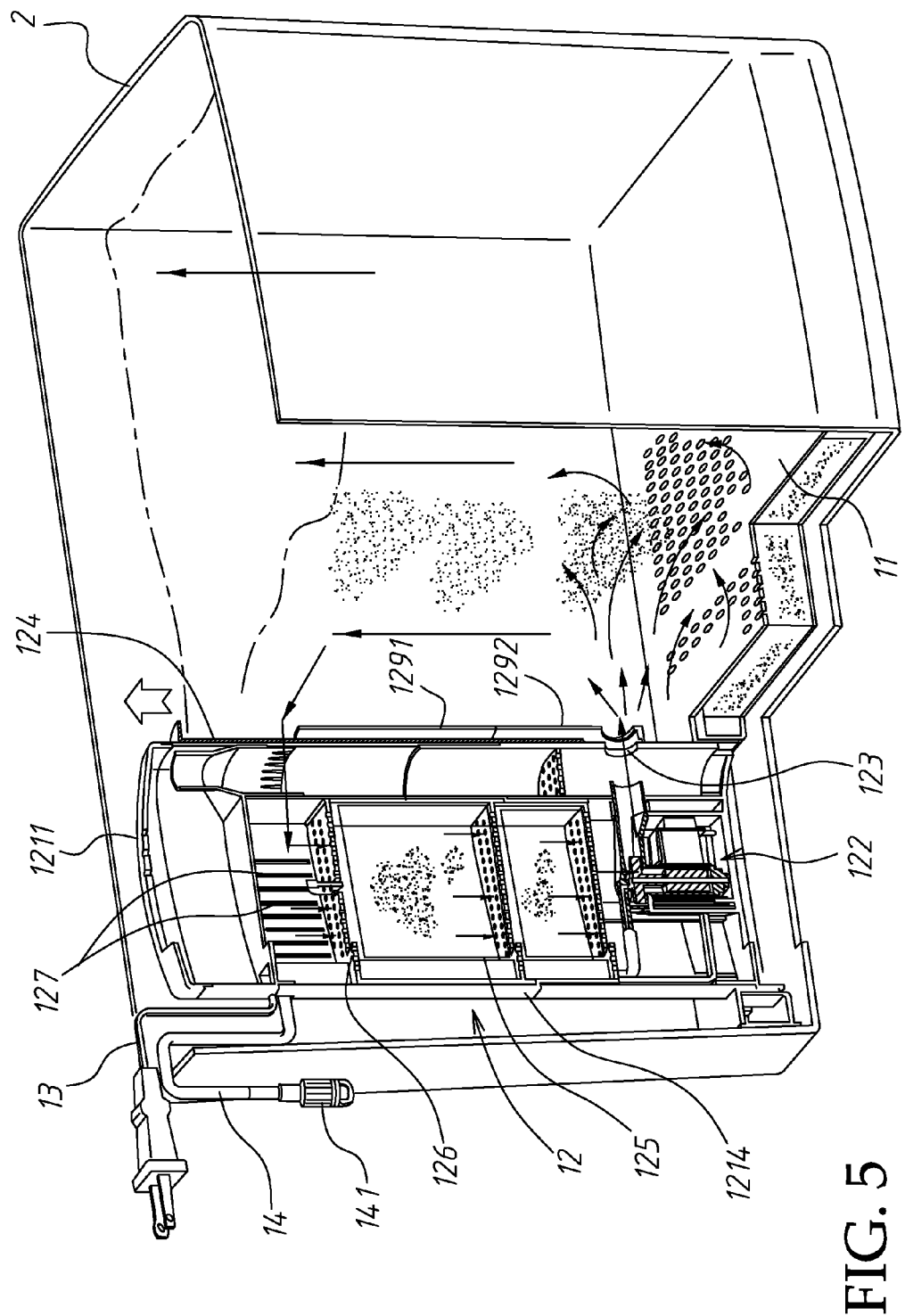
FIG. 5 is a schematic perspective view of the present invention showing the action of water flow, wherein a forceful water jet is sprayed on a surface board of a base.

Outer vertical wall surfaces respectively of the upper section 1214a and the L shaped seat 1212 of the middle layer part 1214 are provided with a slide way 1291 and with a slide way 1292 respectively, in order that the pushing plate 124 can be provided in the slide ways 1291, 1292 to slide up and down to optionally open or close the water discharging hole 123 (please refer to FIG. 4 which shows closing and FIG. 5 which shows opening).

Referring to FIGS. 2 and 3, an upright chimney unit is shown and is composed of a bottom section 151, a middle section 152 and a top section 153. The bottom section 151 is provided inside of the vertical surface of the L shaped seat 1212, the middle section 152 is provided in the upper section 1214a of the middle layer part 1214, while the top section 153 is provided in the square frame 1211b of the cover 1211. The bottom section 151 and the top section 153 are provided respectively with an extension portion 1511 and an extension portion 1531 which are extended respectively into the bottom end and the top end of the middle section 152.

The pump unit 122 is provided at its bottom with a transformer 1223 in connecting with the electric power line 13, in order to provide electric power for a pump 1224.

In using the present invention, the pushing plate 124 can be pushed downwards to close the water discharging hole 123, such as is shown in FIG. 4, to open the air conditioning valve 141 of the air pipe 14, hence the pump unit 122 pumps air into the filtering cylinder 12 to form bubbles in the chimney unit of the filtering cylinder 12 to be led up into the uppermost layer, and water flows into the filtering cylinder 12 through the grid holes 127 to bring garbage to the garbage collecting board 126 for collecting and filtering, and then water after filtering by the filtering box 125 enters the filtering cotton 113 in the base 11 and flows into the aquarium 2 through the holes 112 on the upper surface plate 111, water flow is shown by arrows in the drawing.

Referring to FIG. 5, when the pushing plate 124 is pushed upwards to open the water discharging hole 123, the air conditioning valve 141 of the air conditioning valve 14 closes to stop air from entering the pump unit 122. Then the pump unit 122 generates forceful water jet spraying from the water discharging hole 123 to the upper surface plate 111 of the base 11, to thereby create vortex to change the toxic material in the water into bubbles which are floated upwards to flow into the grid holes 127 of the filtering cylinder 12 to be filtered.

Evidently, by providing the system of the present invention in the aquarium 2, and by virtue that forceful water jet is sprayed to the base 11 to create vortex to change the toxic material into bubbles which are floated upwards to flow into the aquarium 2, and enters the filtering cylinder 12 to be filtered, and then air bubbles are pumped in to make garbage, such as bubbled protein etc., be collected onto a garbage collecting board 126 for being removed easily and for maintaining cleanness of water in the aquarium 2; this system particularly is appropriated for using in a seawater aquarium.

In conclusion, the aquarium filter system of the present invention is a novel structure that meets the element requirement for a patent; it will be apparent to those skilled in this art that various modifications or changes without departing from the spirit of this invention shall also fall within the scope of the appended claims.

The invention claimed is:

1. An aquarium filter system being provided in an aquarium, and comprising:
   a base, laid flat on a bottom surface of said aquarium, said base being a hollow board of which an upper surface plate has a plurality of holes, interior of said hollow board being filled with filtering cotton;
   a filtering cylinder mounted to be perpendicular to said base, and having an outer housing unit, and being provided on its inner bottom layer with a pump unit, further being provided at an outlet on one side of it in opposition to said pump unit with a water discharging hole which is operated with a pushing plate provided on an outer wall of said filtering cylinder to optionally open or close; an inner middle layer of said outer housing unit being provided sequentially upwards from below with a filtering box and a garbage collecting board, said garbage collecting board being provided with a plurality of through holes for flowing therethrough of water, and said filtering cylinder being provided on its front and back sides above said garbage collecting board with a plurality of grid holes for flowing in of water, an interior upper layer of said outer housing unit having a closed cover; and more, said filtering cylinder being provided on an inner side in opposition to said outlet of said pump unit with a upright chimney unit which extends to an uppermost layer of said filtering cylinder;
   an electric power line extending to said filtering cylinder to provide electric power; and,
   an air pipe extending from outside of said aquarium to have its end connected to an air inlet of said pump unit, and to have its other end provided with an air conditioning valve;
   when said pushing plate closes said water discharging hole, said air conditioning valve opens, then said pump unit pumps air into water to form air bubbles in said chimney unit of said filtering cylinder to be led up into said uppermost layer to change toxic material in water into bubbles which are floated upwards to be collected and filtered on said garbage collecting board, and then water being filtered passes said base and flows into said aquarium;

when said pushing plate opens said water discharging hole, said air conditioning valve closes, then said pump unit generates forceful water jet spraying from said water discharging hole to said upper surface plate of said base to create vortex.

2. The aquarium filter system aquarium filter system as claimed in claim 1, wherein said filtering box unit has a first filtering box and a second filtering box stacking one over other, interiors of said first filtering box and said second filtering box are filled with filtering cotton.

3. The aquarium filter system as claimed in claim 1, wherein said cover at said upper layer of said outer housing unit is made of transparent material.

4. The aquarium filter system as claimed in claim 2, wherein a lower layer of said outer housing unit is formed to have an L shaped seat and a U shaped frame enveloping said L shaped seat, said pump unit is mounted between said L shaped seat and said U shaped frame, and said water discharging hole is provided on a vertical surface of said L shaped seat.

5. The aquarium filter system as claimed in claim 4, wherein said middle layer of said outer housing unit is formed a middle layer part composed of an upper section and a lower section integrally connected with each other, a sectional area of said upper section is larger than that of said lower section; said lower section is slipped downwards in said U shaped frame, said lower section and said U shaped frame are extended/contracted relatively to each other in order to adjust length of said filtering cylinder.

6. The aquarium filter system as claimed in claim 5, wherein said cover at said upper layer of said outer housing unit of said filtering cylinder is composed of a lid and a square frame, said square frame has on its bottom edge a flange for slipping over said middle layer part.

7. The aquarium filter system as claimed in claim 6, wherein outer vertical wall surfaces respectively of said upper section and said L shaped seat of said middle layer part are provided each with a slide way, in order that said pushing plate is provided in said slide ways to slide up and down to optionally open or close said water discharging hole.

8. The aquarium filter system as claimed in claim 6, wherein said chimney unit is composed of a bottom section, a middle section and a top section, said bottom section is provided inside of said vertical surface of said L shaped seat, said middle section is provided in said upper section of said middle layer part, while said top section is provided in said square frame of said cover; said bottom section and said top section are provided each with an extension portion which are extended respectively into a bottom end and a top end of said middle section.

9. The aquarium filter system as claimed in claim 1, wherein said pump unit is provided at its bottom with a transformer in connecting with said electric power line, in order to provide electric power for a pump.

* * * * *